United States Patent
Nagata et al.

(10) Patent No.: US 11,724,697 B2
(45) Date of Patent: Aug. 15, 2023

(54) GEOFENCED AI CONTROLLED VEHICLE DYNAMICS

(71) Applicant: TOYOTA MOTOR ENGINEERING & MANUFACTURING NORTH AMERICA, INC., Plano, TX (US)

(72) Inventors: Katsumi Nagata, Foster City, CA (US); Ryan Wiesenberg, Ann Arbor, MI (US); Christopher Risberg, Flower Mound, TX (US); Prathap Alvakonda, Frisco, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 372 days.

(21) Appl. No.: 16/560,131

(22) Filed: Sep. 4, 2019

(65) Prior Publication Data
US 2021/0061279 A1    Mar. 4, 2021

(51) Int. Cl.
| | |
|---|---|
| B60W 30/182 | (2020.01) |
| H04W 4/021 | (2018.01) |
| G08G 1/00 | (2006.01) |
| B60W 10/10 | (2012.01) |
| B60W 10/20 | (2006.01) |
| B60W 10/02 | (2006.01) |

(52) U.S. Cl.
CPC .......... *B60W 30/182* (2013.01); *B60W 10/02* (2013.01); *B60W 10/10* (2013.01); *B60W 10/20* (2013.01); *G08G 1/207* (2013.01); *H04W 4/021* (2013.01); *B60W 2555/20* (2020.02)

(58) Field of Classification Search
CPC .... B60W 30/182; B60W 10/02; B60W 10/10; B60W 10/20; B60W 2555/20; G08G 1/207; H04W 4/021
See application file for complete search history.

(56) References Cited

U.S. PATENT DOCUMENTS

| | | | | |
|---|---|---|---|---|
| 2008/0252487 | A1* | 10/2008 | McClellan | G06Q 10/06398 340/936 |
| 2010/0094500 | A1* | 4/2010 | Jin | G01C 21/26 701/1 |
| 2017/0197617 | A1* | 7/2017 | Penilla | G08G 1/163 |
| 2018/0164810 | A1 | 6/2018 | Luo | |
| 2018/0165893 | A1* | 6/2018 | Palmer | G07C 5/008 |
| 2019/0342739 | A1* | 11/2019 | Shah | G01C 21/3461 |

FOREIGN PATENT DOCUMENTS

JP        07108849        4/1995

OTHER PUBLICATIONS

Zhao et al., "Design of a Control System for an Autonomous Vehicle Based on Adaptive-PID", International Journal of Advanced Robotic Systems; 2012, vol. 9, 44: 2012, pp. 1-11.

* cited by examiner

*Primary Examiner* — Truc M Do
(74) *Attorney, Agent, or Firm* — Sheppard, Mullin, Richter & Hampton LLP; Hector A. Agdeppa; Daniel N. Yannuzzi

(57) ABSTRACT

A system and method of geofenced control of a vehicle, includes determining a geographic region within which a vehicle is operating; retrieving a geo-profile corresponding to the determined geographic region within which the vehicle is operating; and applying the retrieved geo-profile to the vehicle to alter the driving dynamics of the vehicle to conform to driving characteristics of the determined geographic region within which the vehicle is operating.

23 Claims, 6 Drawing Sheets

GEOFENCED AI CONTROLLED VEHICLE DYNAMICS

TECHNICAL FIELD

The present disclosure relates generally to vehicle driving modes, and in particular, some implementations may relate to control of vehicle driving modes based on geographical considerations.

DESCRIPTION OF RELATED ART

Computerized controls have become more and more prevalent in vehicular systems over the past few decades. This has led to an increase in the ability to control individual systems according to driving circumstances or driving preferences. One example of that is the availability of different driving modes to suit different conditions or different driving styles. One early example of this is the Weather Mode that appeared in vehicles that enabled vehicles to more readily accommodate low-traction conditions (e.g., snow, ice). When enabled, this mode caused the vehicle to start in second gear instead of first gear from a stopped position. Another early example is a computerized throttle mapping that learned driver behavior and adjusted throttle mapping according to driver behavior.

Computerized driving mode control has evolved to the point where different vehicle manufacturers offer a variety of different operating modes for their vehicles. Examples of driving modes include Economy mode, Comfort mode, Sport mode, Sport Plus mode, and so on. These modes may adjust a variety of vehicle parameters such as, for example, throttle mapping, shift points, chassis control, steering control, and so on. As a further example, when a Sport mode is selected, the vehicle may be reprogrammed to provide later up shifts and sooner downshifts, harder suspension damping, more aggressive throttle mapping and more responsive steering. In contrast, when an Economy mode is selected, the vehicle may be reprogrammed to provide sooner up shifts and a less aggressive throttle response.

Driving modes are not limited to conventional ICE vehicles, but also apply to hybrid vehicles, e-hybrid electric vehicles, electric vehicles fuel-cell vehicles, and so on. Further, driving modes may be applied to autonomous vehicles as well to tailor the vehicle to passenger preferences.

BRIEF SUMMARY OF THE DISCLOSURE

According to various embodiments of the disclosed technology systems and methods for vehicles may automatically configure operating parameters that relate to vehicle responsiveness or behavior in accordance with the location in which the vehicle is being operated. Crowd sourced the data such as V2X data, including driver and vehicle data, can be collected and evaluated to determine driving characteristics in different geographic locations or within defined geofences. Acceleration and braking styles, lane change styles, turn signal utilization, driving speeds and other operating characteristics can be collected from these sources, learned and used to build geo-profiles within the various geofences. These profiles can be used automatically configure vehicles so that the vehicle operation is more appropriate in view of surrounding vehicles in a given area in which the vehicle is being operated, or that may be more in line with driver expectations for vehicle performance or behavior.

A method of geofenced control of a vehicle may include: determining a geographic region within which a vehicle is operating; retrieving a geo-profile corresponding to the determined geographic region within which the vehicle is operating; and applying the retrieved geo-profile to the vehicle to alter the driving dynamics of the vehicle to conform to driving characteristics of the determined geographic region within which the vehicle is operating. The method may further include determining whether an available geo-profile corresponding to the determined geographic region is compatible with the subject vehicle.

Determining whether an available geo-profile corresponding to the determined geographic region is compatible with the subject vehicle may include determining whether the subject vehicle includes vehicle systems that are controllable by the geo-profile corresponding to the determined geographic region.

The geo-profile may identify a driving mode of the vehicle, and applying the geo-profile to the vehicle may include placing the vehicle in the driving mode identified by the geo-profile. The geo-profile may identify a plurality of vehicle settings, and applying the geo-profile to the vehicle may include applying one or more of those vehicle settings to the vehicle.

The method may further include gathering vehicle operating characteristics data from a plurality of other vehicles operating in a geographic region and constructing a geo-profile based on the vehicle operating characteristics data for the geographic region. The method may further include gathering vehicle operating characteristics data from a plurality of infrastructure elements in a geographic region and constructing a geo-profile based on the vehicle operating characteristics data for the geographic region.

The geo-profile may be stored external to the vehicle and retrieving the geo-profile corresponding to the determined geographic may include receiving at the vehicle the geo-profile from an external storage location. The vehicle may retrieve the geo-profile corresponding to the determined geographic region from a storage location on board the vehicle.

In some embodiments, a profile system external to the vehicle receives the position information to determine the geographic region within which the vehicle is operating, identifies a geo-profile corresponding to the determined geographic region, retrieves the geo-profile corresponding to the determined geographic region and since the retrieved geo-profile to the vehicle.

A non-transitory machine-readable medium having instructions stored therein, which when executed by a processor, cause the processor to perform operations, the operations may include: determining a geographic region within which a vehicle is operating; retrieving a geo-profile corresponding to the determined geographic region within which the vehicle is operating; and applying the retrieved geo-profile to the vehicle to alter the driving dynamics of the vehicle to conform to driving characteristics of the determined geographic region within which the vehicle is operating. The operations may further include determining whether an available geo-profile corresponding to the determined geographic region is compatible with the subject vehicle. The vehicle may retrieve the geo-profile corresponding to the determined geographic region from a storage location on board the vehicle for from an external location.

Determining whether an available geo-profile corresponding to the determined geographic region is compatible with the subject vehicle may include determining whether the subject vehicle includes vehicle systems that are controllable by the geo-profile corresponding to the determined geographic region. The geo-profile may identify a driving mode of the vehicle, and wherein applying the geo-profile to the vehicle may include placing the vehicle in the driving mode identified by the geo-profile. The geo-profile may identify a plurality of vehicle settings, and wherein applying the geo-profile to the vehicle may include applying one or more of those vehicle settings to the vehicle.

The operations may further include gathering vehicle operating characteristics data from a plurality of other vehicles operating in a geographic region and constructing a geo-profile based on the vehicle operating characteristics data for the geographic region.

The operations may further include gathering vehicle operating characteristics data from a plurality of infrastructure elements in a geographic region and constructing a geo-profile based on the vehicle operating characteristics data for the geographic region.

The geo-profile may be stored external to the vehicle and retrieving the geo-profile corresponding to the determined geographic may include receiving at the vehicle the geo-profile from an external storage location.

In some embodiments, a profile system external to the vehicle receives the position information to determine the geographic region within which the vehicle is operating, identifies a geo-profile corresponding to the determined geographic region, retrieves the geo-profile corresponding to the determined geographic region and since the retrieved geo-profile to the vehicle.

A vehicle control system, may include: a position determination system to determine a geographic region within which a vehicle is operating; a driving mode circuit to retrieve a geo-profile corresponding to the determined geographic region within which the vehicle is operating; and wherein the driving mode circuit is further configured to apply the retrieved geo-profile to the vehicle to alter the driving dynamics of the vehicle to conform to driving characteristics of the determined geographic region within which the vehicle is operating.

The driving mode circuit may be further configured to determine whether an available geo-profile corresponding to the determined geographic region is compatible with the subject vehicle. Determining whether an available geo-profile corresponding to the determined geographic region is compatible with the subject vehicle may include determining whether the subject vehicle includes vehicle systems that are controllable by the geo-profile corresponding to the determined geographic region.

The geo-profile may identify a driving mode of the vehicle, and wherein applying the geo-profile to the vehicle may include placing the vehicle in the driving mode identified by the geo-profile. The geo-profile may identify a plurality of vehicle settings, and wherein applying the geo-profile to the vehicle may include applying one or more of those vehicle settings to the vehicle.

The vehicle control system may further include a profile system gathering vehicle operating characteristics data from a plurality of other vehicles operating in a geographic region and constructing a geo-profile based on the vehicle operating characteristics data for the geographic region.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can provide systems and methods for vehicles to automatically configure operating parameters that relate to vehicle responsiveness or behavior in accordance with the location in which the vehicle is being operated. Crowd sourced the data such as V2X data, including driver and vehicle data, can be collected and evaluated to determine driving characteristics in different geographic locations or within defined geofences. Acceleration and braking styles, lane change styles, turn signal utilization, driving speeds and other operating characteristics can be collected from these sources, learned and used to build geo-profiles within the various geofences. These profiles can be used automatically configure vehicles so that the vehicle operation is more appropriate in view of surrounding vehicles in a given area in which the vehicle is being operated, or that may be more in line with driver expectations for vehicle performance or behavior.

Data analytics and AI/ML technologies can be used to collect and analyze the data and build models for vehicle geo-profiles for various geographic regions. The profiles can be stored in the vehicles are in the cloud, and retrieved and applied when a vehicle enters a particular area. They can also be pushed to vehicles as vehicles travel from area to area. In further embodiments, geo-profiles for a vehicle can be set based on the operator's place of residence or other "home base" of operations. The geo-profiles may be applied to conventional vehicles, semi-autonomous vehicles and fully autonomous vehicles.

Semi-autonomous functions such as adaptive cruise control settings (e.g. following distances or other behavior) can be adapted to be more in line with surrounding vehicles. For example, cruise control settings can be adjusted to respond differently to vehicles that are cutting in front of or potentially cutting in front of the subject vehicle based on known or learned driver behaviors in the area.

Autonomous functions can likewise be set so that the autonomous vehicle operates in a way that is more easily anticipated, or in a way it is expected, by surrounding drivers. For example, where the norm is to yield more easily, the vehicle can be programmed to do so.

As noted above, operator-related functions such as throttle mapping and suspension settings might be configured for the operator to conform to the geographic location. For example, cities with aggressive drivers may be an area where the driver prefers a more aggressive throttle mapping. As another example, curving country roads might be areas where the vehicle is configured for tighter suspension and more aggressive downshifts.

Figure 1:
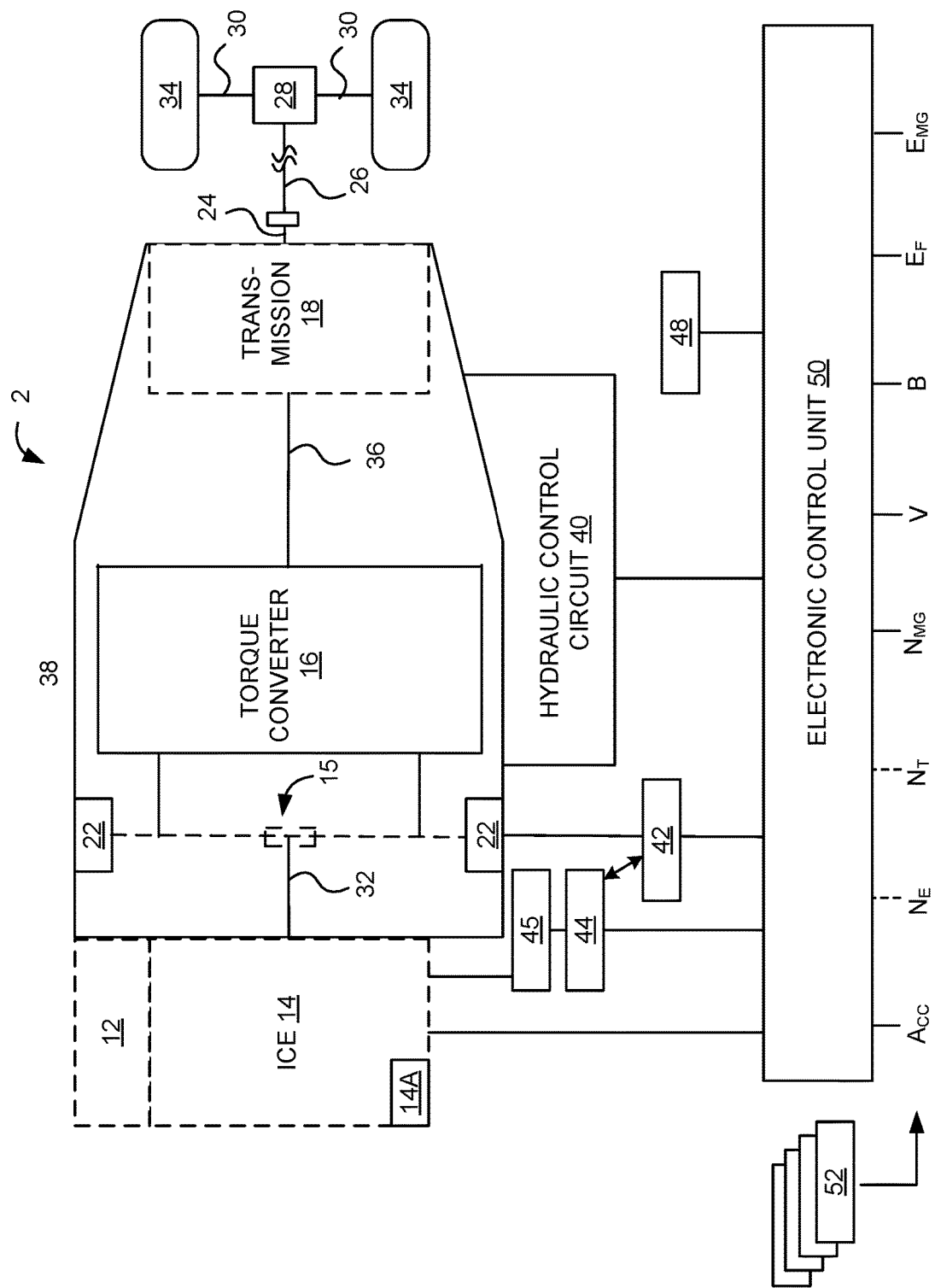
FIG. 1 is a schematic representation of an example hybrid vehicle with which embodiments of the systems and methods disclosed herein may be implemented.

FIG. 1 is an example vehicle with which the technology disclosed herein may be implemented. The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for geofenced AI controlled vehicle dynamics can be implemented in other types of vehicle including gasoline- or diesel-powered vehicles, fuel-cell vehicles, electric vehicles, or other vehicles.

FIG. 1 illustrates a drive system of a vehicle 2 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 2 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery charger 45 may also charge battery 44 using electricity from an electrical outlet, and vehicle charging system, and so on. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 2 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 2. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 2 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Figure 2:
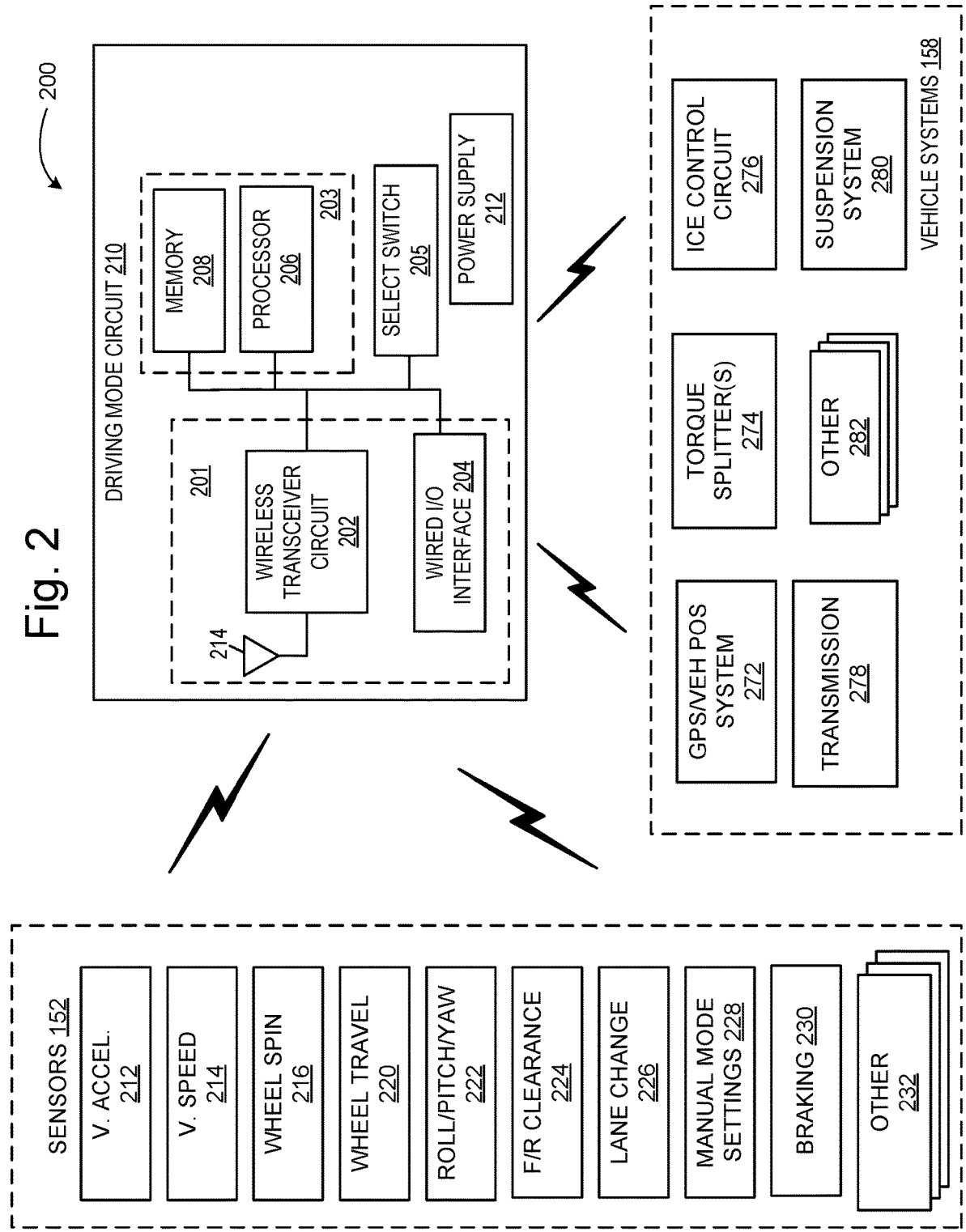
FIG. 2 illustrates an example architecture for geofenced AI controlled vehicle dynamics in accordance with one embodiment of the systems and methods described herein.

FIG. 2 illustrates an example architecture for implementing geo-profiles in accordance with one embodiment of the systems and methods described herein. Referring now to FIG. 2, in this example, geofenced vehicle dynamics system 200 includes a driving mode circuit 210, a plurality of sensors 152, and a plurality of vehicle systems 158. Sensors 152 and vehicle systems 158 can communicate with driving mode circuit 210 via a wired or wireless communication interface. Although sensors 152 and vehicle systems 158 are depicted as communicating with driving mode circuit 210, they can also communicate with each other as well as with other vehicle systems. driving mode circuit 210 can be implemented as an ECU or as part of an ECU such as, for example electronic control unit 50. In other embodiments, driving mode circuit 210 can be implemented independently of the ECU.

Driving mode circuit 210 in this example includes a communication circuit 201, a decision circuit 203 (including a processor 206 and memory 208 in this example) and a power supply 212. Components of driving mode circuit 210 are illustrated as communicating with each other via a data bus, although other communication in interfaces can be included. driving mode circuit 210 in this example also includes a manual mode select switch 205 that can be operated by the user to manually select vehicle operating modes.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to driving mode circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a driving mode circuit 210.

Communication circuit 201 either or both a wireless transceiver circuit 202 with an associated antenna 214 and a wired I/O interface 204 with an associated hardwired data port (not illustrated). As this example illustrates, communications with driving mode circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by driving mode circuit 210 to/from other entities such as sensors 152 and vehicle systems 158. Wireless transceiver circuit 202 can be used to provide wireless communications with sensors 152, vehicle systems 158 and components or systems external to the vehicle such as, for example, other vehicles, infrastructure elements, cloud servers, and so on.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and $NiH_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or not otherwise be included on a standard vehicle 2 with which the geofenced vehicle dynamics system 200 is implemented. In the illustrated example, sensors 152 include vehicle acceleration sensors 212, vehicle speed sensors 214, wheelspin sensors 216 (e.g., one for each wheel), wheel-travel sensors 220 (e.g., one for each wheel), accelerometers such as a 3-axis accelerometer 222 to detect roll, pitch and yaw of the vehicle, vehicle clearance sensors 224 (e.g., to detect following distances), lane change sensors 226, and manual-mode-setting sensors 228 (e.g., to detect operating modes selected manually by a vehicle occupant) and braking sensors 230. Additional sensors 232 can also be included as may be appropriate for a given implementation of geofenced vehicle dynamics system 200. These sensors 152 may be used to gather data that can be used to evaluate driving behaviors for the vehicle.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 that control distribution of power among the vehicle wheels such as, for example, by controlling front/rear and left/right torque split; engine control circuits 276 to control the operation of engine (e.g. Internal Combustion Engine (ICE) 14); transmission 278; suspension system 280 such as, for example, an adjustable-height air suspension system or an adjustable-damping suspension system; and other vehicle systems.

During operation, driving mode circuit 210 can receive information from various vehicle sensors to collect information that might be used to build geo-profiles and to determine whether an available geo-profile should be activated. In some embodiments, select switch 205 may be implemented such that, the driver may manually select an operating mode. This might be used, for example, to override a geo-profile automatically implemented by the vehicle. Manual selection may also be used as an additional data point when evaluating information to build or update geo-profiles for various regions. Communication circuit 201 can be used to transmit and receive information between driving mode circuit 210 and sensors 152, and driving mode circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used in determining whether to activate the assist mode. Additionally, communication circuit 201 can be used to send an activation signal or other activation information to various vehicle systems 158 as part of implementing a selected driving mode. For example, as described in more detail below, communication circuit 201 can be used to send signals to one or more of: torque splitters 274 to control front/rear torque split and left/right torque split; ICE controllers 276 to, for example, control cylinder activation/deactivation, valve timing, fuel delivery, and so on; suspension system 280 (e.g., to adjust ride height or adjust suspension damping); and transmission 278 (e.g., to adjust shift points or speed of shifting gears). The decision regarding what action to take via these various vehicle systems 158 can be made based on the geo-profile selected and loaded for the geofence region in which the vehicle is currently operating. Examples of this are described in more detail below.

Figure 3:
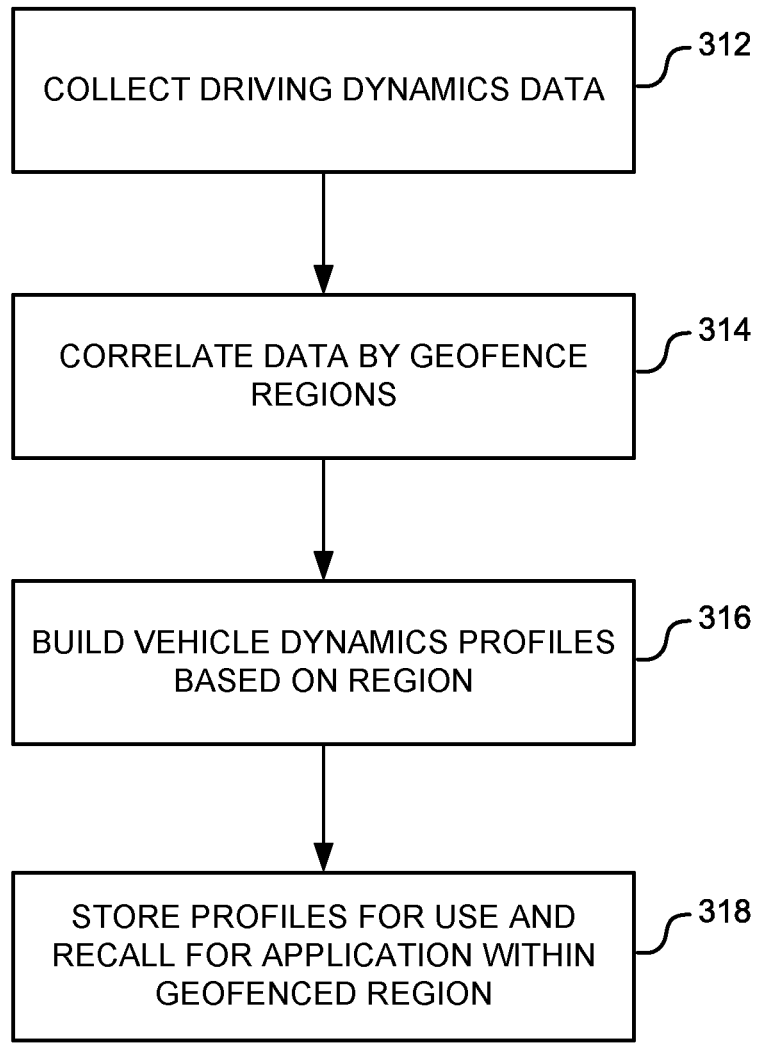
FIG. 3 illustrates an example process for geofenced AI controlled vehicle dynamics in accordance with one embodiment of the systems and methods described herein.

FIG. 3 illustrates an example process for implementing geo-profiles in accordance with embodiments of the systems and methods disclosed herein. With reference now to FIG. 3, at operation 312 a geofenced vehicle dynamics system collects vehicle operating characteristics for a plurality of vehicles in a plurality of different geographic regions. For example, sensor data (e.g., from sensors 52, 152) can be gathered to determine vehicle operating parameters in different geographic regions. Sensor data can be used, for example, to determine whether a vehicle is being operated aggressively, moderately, sedately, and so on. This information can be used to detect data leading to information such as following distances, acceleration and deceleration rates, vehicle speeds, speeds in corners, frequency of lane changes, aggressiveness of lane changes, and so on.

Similarly, information from vehicle systems (e.g., vehicle systems 158) may be collected to similar determine vehicle operating parameters in different geographic regions. Also, information regarding driving modes selected for a vehicle in various geographic regions may also be collected.

In addition to information from a plurality of vehicles, infrastructure information may also be collected to determine driving behaviors in various geographic regions. For example, roadway and other smart-highway sensors used to monitor traffic behavior and traffic flow can detect information relevant to determining driving styles for geographic regions including, for example, vehicle speeds, following distances, propensity to run traffic lights, aggressiveness of lane changes, and so on. Other sources of information may also be used such as, for example, third-party data services that may provide data or other information relating to driving behaviors in various areas.

At operation 314, the information is collected and correlated by geofence regions. In this operation, data can be gathered by region. Operation 316, the data can be analyzed to build vehicle dynamics profiles when a region-by-region basis. These geo-profiles may specify, for example, driving dynamics for their respective geographic regions. In some embodiments, this can be a relatively high-level specification such as specifying driving dynamics categories in two, three, four, five, six or more different categories. Further to this example, categories might be styled as sedate, mild, moderate, assertive, aggressive and hyper-aggressive. These categories might have a plurality of vehicle settings associated with each. For example, a mild category might have a light throttle mapping, soft suspension setting, soft or isolated steering setting, low shift points, far following distances (e.g., for dynamic cruise control or AV operation), non-aggressive lane change behavior (e.g., for AV operation), and so on. As another example, aggressive category might have a more aggressive throttle mapping, a stiffer suspension setting, a greater level of steering feedback, higher shift points, closer following distances (e.g., for dynamic cruise control or AV operation), more aggressive lane change behavior (e.g., for AV operation), and so on.

In another embodiment, geo-profiles might not be categories, per se, but simply a collection of vehicle settings that can be loaded to the vehicle to control one or more of the controllable vehicle systems or settings. Because different vehicles may offer different levels of controllable equipment (e.g., some might not offer adjustable suspension) each of the available settings might not be applicable to each of the vehicles in a region. Nonetheless, those that are applicable may be applied to the vehicle.

At operation 318, the geo-profiles created are stored for recall and use within a geofence region. These profiles may be downloaded to the vehicle and stored on board for later recall on the vehicle enters a corresponding geofence region. In another embodiment, the profiles may be stored remotely (e.g. in a cloud-based or other remote storage system) and a profile corresponding to a geofence region may be downloaded to the vehicle when the vehicle enters that geofence region.

Figure 4:
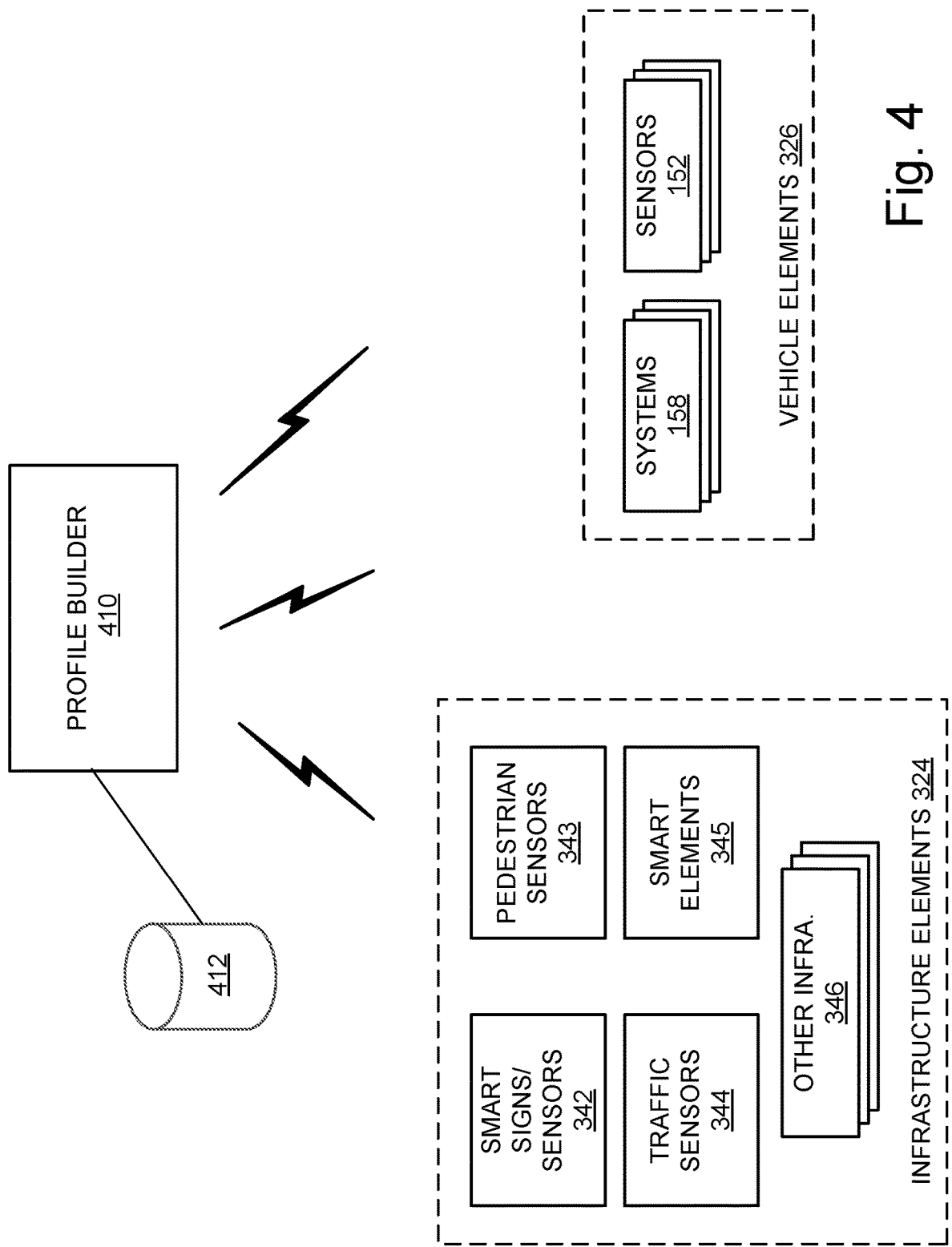
FIG. 4 illustrates an example system for geofenced AI controlled vehicle dynamics in accordance with one embodiment of the systems and methods described herein.

FIG. 4 illustrates an example profile system for building and storing geo-profiles in accordance with one embodiment. Referring now to FIG. 4, a profile builder 410 is provided along with an associated data store 412. Profile builder 410 collects information from a plurality of different sources to build a plurality of geo-profiles for a plurality of geofence regions. Profile builder 410 may be, for example, a cloud-based server or other computing system, or a distributed computing system, to collect information and build geo-profiles for various geographic regions. In other implementations, profile builder 410 may be a vehicle-based computing system to gather information and build profiles (e.g., implemented as part of driving mode circuit 210) or an edge-based distributed computing platform. As these examples illustrate, profile builder 410 may be implemented utilizing one or more computing resources at one or more various locations.

In the illustrated example, profile builder 410 collects information from infrastructure elements 324 and vehicle elements 326. The information collected can be geo-tagged such that the data can be associated with a particular geofence region. Profile builder 410 gathers the information from these sources, correlates the gathered information to its associated respective geofence region, and analyzes the information to build geo-profiles for each region. An example of this is illustrated at FIG. 3.

In the example illustrated of FIG. 4, vehicle elements 326 from which information may be gathered to build geo-profiles may include vehicle systems 158 and sensors 152. Particularly, information may be gathered from a position information system such as, for example, from a GPS or other vehicle positioning system 272. Other information from vehicle elements 326 may include sensor data from sensors 152, 52 and system information such as from other vehicle systems 158 that can be analyzed to determine vehicle operating characteristics and driver driving characteristics for the various regions.

Infrastructure elements 324 from which information may be gathered to build geo-profiles may include smart signs/sensors 342, pedestrian sensors 343, traffic sensors 344, smart roadway elements 345, or other infrastructure elements 346. This information can be used, for example, to provide observed information such as, for example, traffic density, following distances, driving behavior, lane change behavior, acceleration/deceleration rates, and so on.

Figure 5:
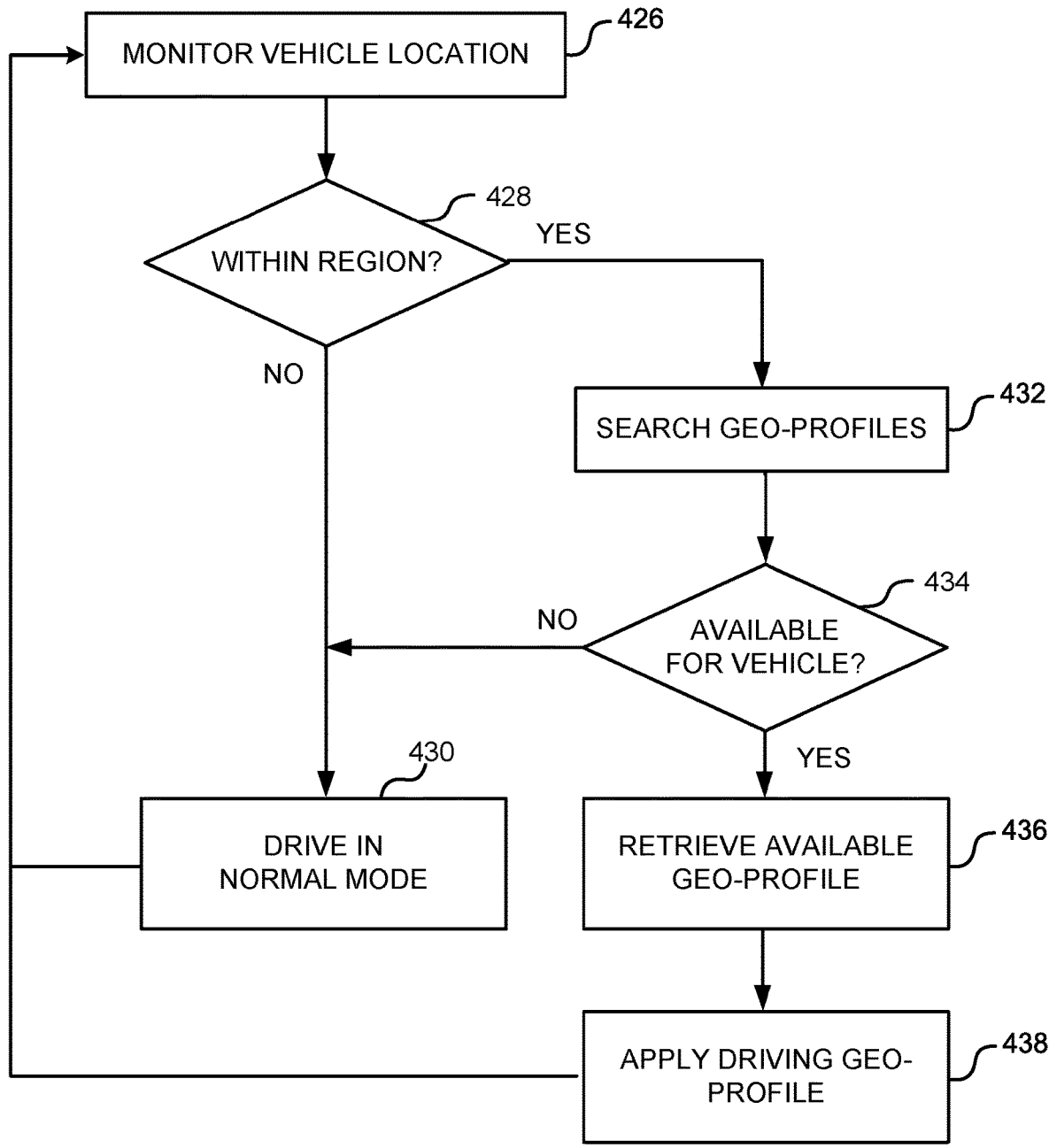
FIG. 5 illustrates an example system for applying geo-profiles to a vehicle in a geofence region in accordance with one embodiment of the systems and methods described herein
Figure 6:
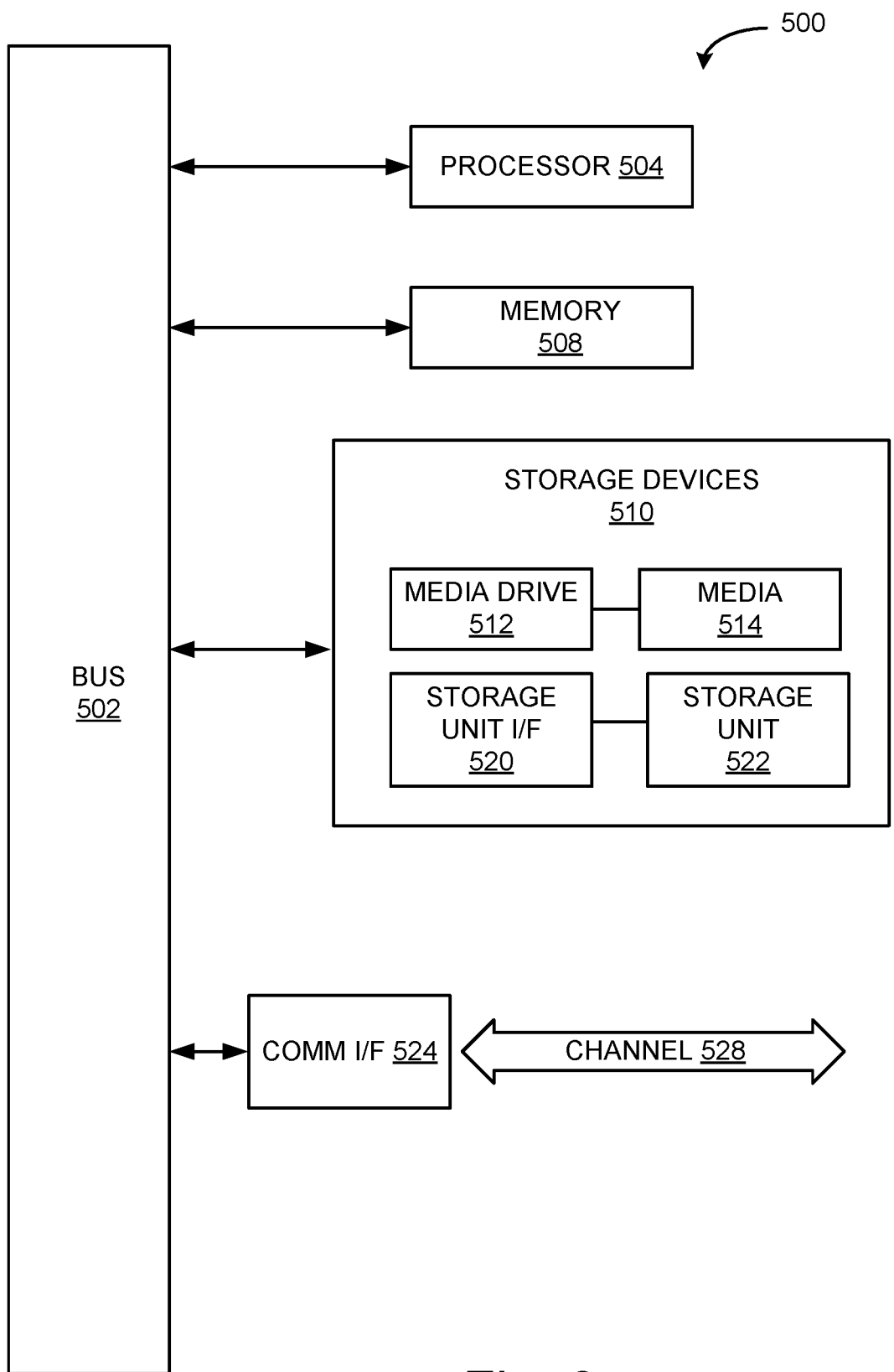
FIG. 6 illustrates an example computing component that may be used to implement various features of embodiments described in the present disclosure.

FIG. 5 illustrates an example process by which a vehicle dynamics control system utilizes geo-profiles for geofenced controlled vehicle dynamics in accordance with one embodiment of the systems and methods disclosed herein. With reference now to FIG. 5, at operation 426 the system monitors the current vehicle location. For example, an onboard GPS or other position determination system (e.g., GPS/vehicle positioning system 272) can monitor the current position of a subject vehicle. This information may be maintained on board the vehicle such as for an onboard vehicle dynamics control system (e.g., driving mode circuit 210), or it may be transmitted to a vehicle dynamics control system external to the vehicle.

At operation 428 the system determines whether the vehicle is within a geofenced region and if so, which region the vehicle is currently in. This may be determined, for example, using information from the vehicle's GPS or other position determination system. In one embodiment, the system may compare a current vehicle position (e.g., latitude/longitude, address, or other position information) with information indicating the identification of one or more geofence regions.

The vehicle is not in an identified geofence region that has a vehicle dynamics geo-profile, the vehicle continues to operate in a normal driving mode at operation 430. For example, the vehicle may continue to operate in accordance with current vehicle settings. That is, the system does not change the driving mode or the operational parameters of the vehicle. Operation continues at 426 where the system continues to monitor the vehicle location and check to determine whether it is entered a geofence region with an associated geo-profile.

If the vehicle has entered a geofence region with an associated geo-profile, the system searches the profiles at operation 432 to determine whether there is a geo-profile available that is compatible with that vehicle or vehicle type within the geofence region. For example, the system may determine whether a profile for that region addresses vehicle parameters that may be addressed for that particular type of vehicle. Examples of determining compatibility may include determining whether the subject vehicle includes one or more of the vehicle systems that are compatible with or controllable by the controls applied by the geo-profile; determining whether the geo-profile settings are compatible with the subject vehicle. If a profile does not exist for the region, or for the vehicle within that region, (as illustrated at operation 434) the system continues to operate in a normal driving mode (or in its current driving mode) as shown at operation 430.

If, on the other hand, a geo-profile does exist for that vehicle in that region, the geo-profile is retrieved at operation 436 and applied to the vehicle at operation 438. In various embodiments, the settings identified by the geo-profile, as applicable to the vehicle, are applied to adjust one or more corresponding vehicle systems. In some embodiments, the geo-profile may operate to select the driving mode within the vehicle from among a plurality of preprogrammed driving mode. In other embodiments, the geo-profile may operate to adjust various vehicle systems individually in accordance with the geo-profile requirements.

For example, an onboard system such as driving mode circuit 210 may be configured to retrieve the available geo-profile operation 436 and apply the retrieved geo-profile at operation 438. driving mode circuit 210 may retrieve the available geo-profile such as by retrieving it from a storage location (e.g., on board the vehicle) or by receiving it from an external system such as, for example, an external geo-profile generation system.

To apply the profile, driving mode circuit 210 may engage a driving mode of the vehicle corresponding to the retrieved geo-profile. For example, the geo-profile may be tailored to the specific vehicle (e.g., geo-profile may specify a mode matching a vehicle mode such as ECO mode, SPORT mode, COMFORT mode, etc) such that the geo-profile is specific to the particular vehicle, the vehicle make and model, the vehicle trim, the particular vehicle configuration, etc. As another example, the geo-profile may generally correspond to vehicle operating modes such that an aggressive profile corresponds to a SPORT mode whereas a more sedate profile may correspond to a COMFORT mode. Driving mode circuit 210 may engage a driving mode of the vehicle to match the preferences of the driver or passengers automatically as soon as the geo-profile was applied.

In another embodiment, to apply the profile, driving mode circuit 210 may send specific control signals to various vehicle systems (e.g., vehicle systems 158) to tailor the system settings according to the geo-profile. For example, where the retrieved profile is a geo-profile indicating an aggressive profile, driving mode circuit 210 may send control signals to configure the systems for the most aggressive throttle mapping, the tightest suspension setting, the lowest vehicle right height, highest shift points, etc., for that particular vehicle. Likewise, where the retrieved profile is a more sedate profile, driving mode circuit 210 may send control signals to configure the systems for the least aggressive throttle mapping, the softest suspension setting, a normal vehicle right height, and so on.

If still further embodiments, rather than identify a mode or style, the geo-profile may specify plurality of vehicle settings corresponding to the region. The geo-profile might include system settings corresponding to a particular vehicle, or it may include more general system settings that could be mapped to a plurality of different vehicles. As an example of the latter case, the geo-profile might state throttle mapping settings such as most aggressive, normal, least aggressive; suspension setting such as firm is setting, normal setting, softest setting; and so on. Accordingly, driving mode circuit 210 may be implemented to map these geo-profile settings to corresponding vehicle settings.

As these examples illustrate, in some embodiments geo-profiles may correspond directly to (or be mappable to) factory-set driving modes available for the vehicle, while in other embodiments, geo-profiles may result in specific system settings independent of factory-set vehicle driving modes. In still further embodiments, a hybrid approach may be taken in which the geo-profile may correspond to a factory-set driving mode in which various vehicle parameters within that mode or various other vehicle parameters are modified according to the geo-profile.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Cellular, Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of geofenced control of a vehicle, comprising:
   determining a geographic region within which a vehicle is operating;
   retrieving a geo-profile corresponding to the determined geographic region within which the vehicle is operating, wherein the geo-profile comprises driving dynamics and is created based on driving styles in the geographic region and vehicle settings associated with the driving dynamics;
   determining whether the geo-profile is compatible with one or more vehicle systems within the vehicle; and
   applying the retrieved geo-profile to the vehicle to alter the driving dynamics of the vehicle to conform to driving characteristics of the determined geographic region within which the vehicle is operating, wherein applying the retrieved geo-profile to the vehicle to alter the driving dynamics of the vehicle comprises applying only those vehicle settings to the vehicle that are determined to be compatible with the one or more vehicle systems within the vehicle.

2. The method of claim 1, wherein determining whether an available geo-profile corresponding to the determined geographic region is compatible with the vehicle comprises determining whether the vehicle includes vehicle systems that are controllable by the geo-profile corresponding to the determined geographic region.

3. The method of claim 1, wherein the geo-profile identifies a driving mode of the vehicle, and wherein applying the geo-profile to the vehicle comprises placing the vehicle in the driving mode identified by the geo-profile.

4. The method of claim 1, wherein applying the geo-profile to the vehicle comprises applying one or more of the vehicle settings to the vehicle.

5. The method of claim 1, further comprising gathering vehicle operating characteristics data from a plurality of other vehicles operating in a geographic region and constructing a geo-profile based on the vehicle operating characteristics data for the geographic region.

6. The method of claim 1, further comprising gathering vehicle operating characteristics data from a plurality of infrastructure elements in a geographic region and constructing a geo-profile based on the vehicle operating characteristics data for the geographic region.

7. The method of claim 1, wherein the geo-profile is stored external to the vehicle and retrieving the geo-profile corresponding to the determined geographic comprises receiving at the vehicle the geo-profile from an external storage location.

8. The method of claim 1, wherein a profile system external to the vehicle receives the position information to determine the geographic region within which the vehicle is operating, identifies a geo-profile corresponding to the determined geographic region, retrieves the geo-profile corresponding to the determined geographic region and since the retrieved geo-profile to the vehicle.

9. The method of claim 1, wherein the vehicle retrieves the geo-profile corresponding to the determined geographic region from a storage location on board the vehicle.

10. A non-transitory machine-readable medium having instructions stored therein, which when executed by a processor, cause the processor to perform operations, the operations comprising:
    determining a geographic region within which a vehicle is operating;
    retrieving a geo-profile corresponding to the determined geographic region within which the vehicle is operating, wherein the geo-profile comprises driving dynamics and is created based on driving styles in the geographic region and vehicle settings associated with the driving dynamics;
    determining whether the geo-profile is compatible with one or more vehicle systems within the vehicle; and
    applying the retrieved geo-profile to the vehicle to alter the driving dynamics of the vehicle to conform to driving characteristics of the determined geographic region within which the vehicle is operating, wherein applying the retrieved geo-profile to the vehicle to alter the driving dynamics of the vehicle comprises applying only those vehicle settings to the vehicle that are determined to be compatible with the one or more vehicle systems within the vehicle.

11. The machine-readable medium of claim 10, wherein determining whether an available geo-profile corresponding to the determined geographic region is compatible with the vehicle comprises determining whether the vehicle includes vehicle systems that are controllable by the geo-profile corresponding to the determined geographic region.

12. The machine-readable medium of claim 10, wherein the geo-profile identifies a driving mode of the vehicle, and wherein applying the geo-profile to the vehicle comprises placing the vehicle in the driving mode identified by the geo-profile.

13. The machine-readable medium of claim 10, wherein applying the geo-profile to the vehicle comprises applying one or more of those vehicle settings to the vehicle.

14. The machine-readable medium of claim 10, further comprising gathering vehicle operating characteristics data from a plurality of other vehicles operating in a geographic region and constructing a geo-profile based on the vehicle operating characteristics data for the geographic region.

15. The machine-readable medium of claim 10, further comprising gathering vehicle operating characteristics data from a plurality of infrastructure elements in a geographic region and constructing a geo-profile based on the vehicle operating characteristics data for the geographic region.

16. The machine-readable medium of claim 10, wherein the geo-profile is stored external to the vehicle and retrieving the geo-profile corresponding to the determined geographic comprises receiving at the vehicle the geo-profile from an external storage location.

17. The machine-readable medium of claim 10, wherein a profile system external to the vehicle receives the position information to determine the geographic region within which the vehicle is operating, identifies a geo-profile corresponding to the determined geographic region, retrieves the geo-profile corresponding to the determined geographic region and since the retrieved geo-profile to the vehicle.

18. The machine-readable medium of claim 10, wherein the vehicle retrieves the geo-profile corresponding to the determined geographic region from a storage location on board the vehicle.

19. A vehicle control system, comprising:
    a position determination system to determine a geographic region within which a vehicle is operating;

a driving mode circuit to locate a geo-profile corresponding to the determined geographic region, wherein the geo-profile comprises driving dynamics and is created based on driving styles in the geographic region and vehicle settings associated with the driving dynamics, determine whether the geo-profile is compatible with one or more vehicle systems within the vehicle, and retrieve a geo-profile corresponding to the determined geographic region within which the vehicle is operating; and wherein the driving mode circuit is further configured to apply the retrieved geo-profile to the vehicle to alter the driving dynamics of the vehicle to conform to driving characteristics of the determined geographic region within which the vehicle is operating, wherein applying the retrieved geo-profile to the vehicle to alter the driving dynamics of the vehicle comprises applying only those vehicle settings to the vehicle that are determined to be compatible with the one or more vehicle systems within the vehicle.

20. The vehicle control system of claim 19, wherein determining whether an available geo-profile corresponding to the determined geographic region is compatible with the vehicle comprises determining whether the vehicle includes vehicle systems that are controllable by the geo-profile corresponding to the determined geographic region.

21. The vehicle control system of claim 19, wherein the geo-profile identifies a driving mode of the vehicle, and wherein applying the geo-profile to the vehicle comprises placing the vehicle in the driving mode identified by the geo-profile.

22. The vehicle control system of claim 19, wherein applying the geo-profile to the vehicle comprises applying one or more of those vehicle settings to the vehicle.

23. The vehicle control system of claim 19, further comprising a profile system gathering vehicle operating characteristics data from a plurality of other vehicles operating in a geographic region and constructing a geo-profile based on the vehicle operating characteristics data for the geographic region.

* * * * *